(12) United States Patent
Wildgruber

(10) Patent No.: US 12,502,991 B2
(45) Date of Patent: Dec. 23, 2025

(54) ENERGY SYSTEM FOR AN ELECTRIC VEHICLE

(71) Applicant: AUDI AG, Ingolstadt (DE)

(72) Inventor: Mario Wildgruber, Rohrbach (DE)

(73) Assignee: AUDI AG, Ingolstadt (DE)

( * ) Notice: Subject to any disclaimer, the term of this patent is extended or adjusted under 35 U.S.C. 154(b) by 694 days.

(21) Appl. No.: 17/975,393

(22) Filed: Oct. 27, 2022

(65) Prior Publication Data

US 2023/0138664 A1    May 4, 2023

(51) Int. Cl.
*B60L 53/22*    (2019.01)

(52) U.S. Cl.
CPC .................. *B60L 53/22* (2019.02)

(58) Field of Classification Search
CPC .... B60L 53/22; B60L 3/0046; B60L 2210/10; B60L 1/00; B60L 58/20; B60L 1/003; B60L 50/60; Y02T 10/70; H02M 3/33584; H02J 7/0063; H02J 7/007; H02J 2207/20

USPC .......................................................... 320/109
See application file for complete search history.

(56) References Cited

U.S. PATENT DOCUMENTS

| | | | |
|---|---|---|---|
| 2014/0204616 A1 | 7/2014 | Biebach et al. | |
| 2019/0148973 A1* | 5/2019 | Kim | B60L 53/22 320/109 |
| 2020/0076311 A1 | 3/2020 | Bortis et al. | |

FOREIGN PATENT DOCUMENTS

| | | |
|---|---|---|
| CN | 103904905 A | 7/2014 |
| DE | 102012219365 A1 | 4/2014 |
| DE | 102013210293 A1 | 12/2014 |
| DE | 202019000939 U1 | 5/2019 |
| EP | 2662964 B1 | 12/2017 |
| JP | 2008005685 A | 1/2008 |
| KR | 101548528 B1 | 9/2015 |

* cited by examiner

*Primary Examiner* — Paul Dinh
(74) *Attorney, Agent, or Firm* — Seed Intellectual Property Law Group LLP

(57) ABSTRACT

A system for the electrical power supply of a vehicle and a method for the electrical power supply of a vehicle are described.

10 Claims, 1 Drawing Sheet

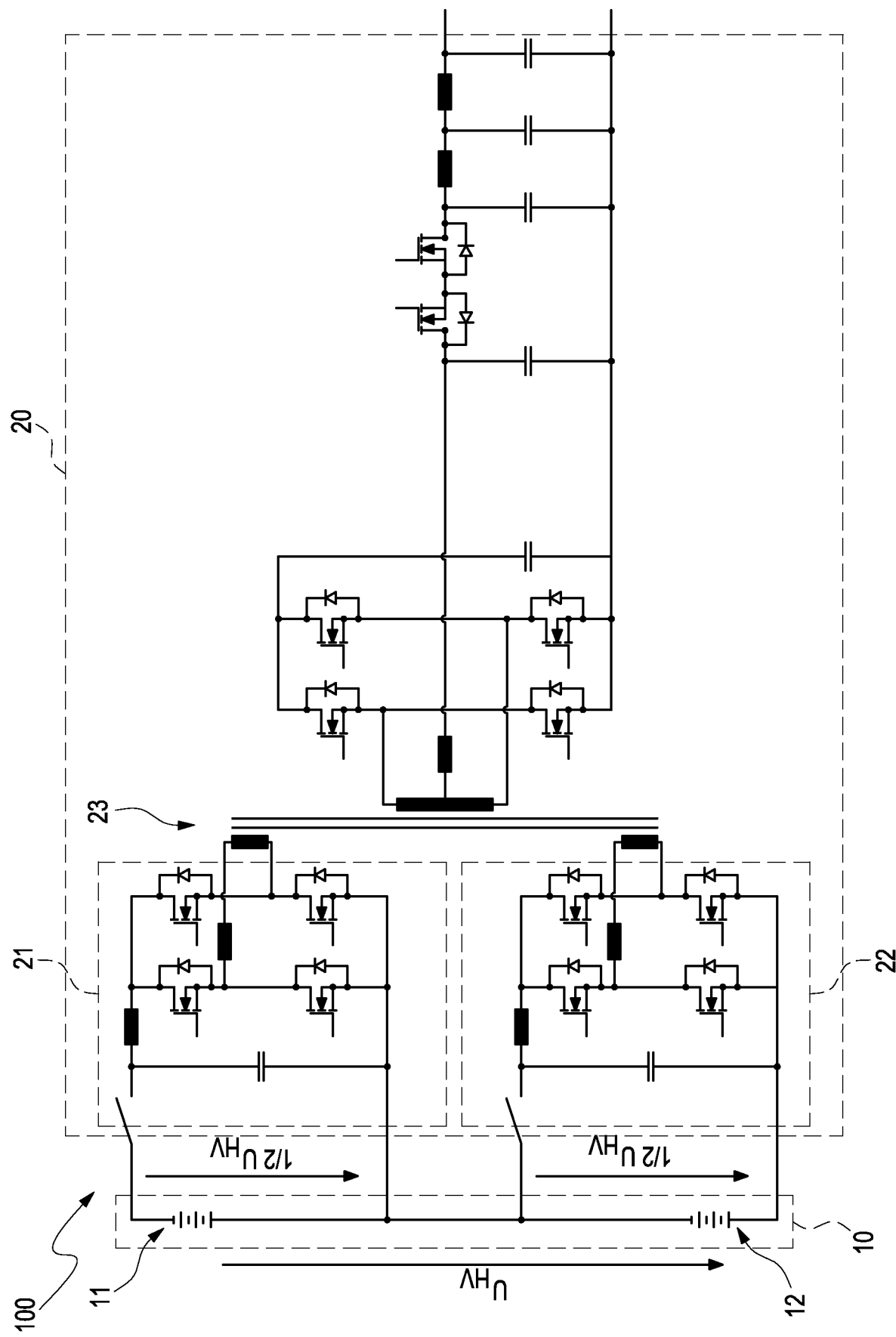

ENERGY SYSTEM FOR AN ELECTRIC VEHICLE

BACKGROUND

Technical Field

Embodiments of the invention relate to a system for the electrical power supply of a vehicle and a method for the electrical power supply of a vehicle.

Description of the Related Art

In present-day electrically propelled vehicles such as plug-in hybrid-electric vehicles (PHEV), battery electric vehicles (BEV), or hybrid electric vehicles (HEV), which are outfitted with a high-voltage energy accumulator (HV battery), direct current converters (DC/DC converters) are used to power the low-voltage onboard network (LV onboard network). The DC/DC converters are primarily powered by the HV battery and are connected after the battery contactor to the full system voltage. These HV networks are not subject to any ASIL safety classification at present and therefore they are only conditionally suited—or not suited at all—to use with highly automated driver assist systems—depending on the modification KR 101 548 528 B1 relates to a DC/DC converter. The DC/DC converter comprises a switching unit, which alternatively switches the DC input power, a transformation unit, comprising a single transformer having one primary winding and one secondary winding, which transforms the power fed into the primary winding and puts out the transformed power to the secondary winding side, a rectifier unit, which comprises a switching element and a first to fourth diode and which is operated in a high-voltage mode or a low-voltage mode according to the operation of a switching element, and an output filter, which filters the power put out by the rectifier unit.

JP 2008/005685 A describes a DC-DC converter having a circuitry structure in which a single-winding transformer is used, forming part of the winding in common between a primary winding and a secondary winding, in order to apply voltages divided in accordance with the winding ratio to the synchronous rectification switch if a main switch is in the On state, in order to prevent an input voltage being applied directly to the synchronous rectification switch. In this way, an element with a lower breakdown voltage than an input voltage can be used for the synchronous rectification switch, thereby reducing the power loss with improved efficiency in the DC-DC converter.

Given this background, one problem to be solved was to provide a reliable supply of electric energy to a low-voltage onboard network of an electric vehicle that also fulfills the safety criteria for a use with highly automated driver assist systems.

BRIEF SUMMARY

Some embodiments include a system for the electrical power supply of an electric vehicle having at least one high-voltage (HV) onboard network and at least one low-voltage (LV) onboard network.

In the context of the present specification, a HV onboard network shall mean a high-voltage onboard network having a voltage level of more than 200 V, especially in the range of 300 V to 1200 V, such as 400 V or 800 V. A HV battery is a high-voltage energy accumulator with a rated output voltage in the range of 300 V to 1200 V, such as 400 V or 800 V. A LV onboard network shall mean a low-voltage onboard network, having a voltage level of less than 100 V, especially in the range of 10 to 60 V, such as 12 V or 48 V.

In some embodiments, a system is designed for the electrical power supply of an electric vehicle, wherein the vehicle comprises multiple electrical participants, usually consumers or energy sources. The system is arranged in the vehicle and comprises a HV battery or accumulator having two branches connected in series, each having at least one energy accumulator cell. Each branch comprises at least one energy accumulator cell, such as a battery cell, and multiple energy accumulator cells can be connected to each other in parallel and/or in series in a respective branch.

The poles of the HV battery are connected across circuit breaker elements, such as battery contactors, to a HV onboard network of the vehicle, which comprises high-voltage units of the vehicle, such as electric machines for the propulsion, heating and cooling units, as well as charging modules for alternating current and/or direct current charging of the HV battery. Each time to the poles of the sub-branches of the HV battery there is connected an input module of a DC/DC converter, which comprises a DC/AC converter unit (HV bridge) and is connected to one of the primary windings of a transformer having multiple primary windings and one common secondary winding. In one embodiment, the DC/DC converter comprises two or more HV bridges as input modules, a common transformer, and a common secondary side.

In one embodiment of the DC/DC converter, the HV bridges of the input modules are designed as full bridges. Depending on the power demand and the voltage spread of the HV side, other topologies can also be used. In one embodiment the HV bridges are designed as half bridges. In another embodiment the HV bridges are designed as a resonance converter.

In one embodiment the secondary winding of the transformer comprises a center tap, which is utilized on the secondary side (center tap technology). In another embodiment an active full bridge is used on the secondary side. In yet another embodiment, a passive or active rectifier is used. In yet another embodiment, a current doubler is used.

Among the features of the energy system described herein is that a center tap of the HV battery achieves an enhanced availability of the voltage supply. In addition, the DC/DC converter is in front of the main contactors, so that it does not need to be isolated from the power supply voltage in event of a fault in a QM consumer. The power supply of the LV onboard network continues to be assured in event of a fault.

The center tap of the HV battery creates two sub-banks, each having half the system voltage. The energy system as described herein has a DC/DC converter topology, which can utilize the entire HV battery or only one of the two battery banks. In normal operation, each phase carries respectively half the power to the transformer. In event of a fault in a battery bank, the full power can be put out across the remaining phase to the low-voltage onboard network. In this way, one achieves a stable power supply with only slightly increased componentry expense. The use of a common transformer (including iron core) affords packing and weight advantages over the use of two fully redundant DC/DC converters.

It is possible for the DC/DC converter to be situated as an external component outside the energy accumulator or to be situated and thus integrated as an internal component in the energy accumulator.

Some embodiments include a method for the electrical power supply of an electric vehicle, comprising at least one HV onboard network and at least one LV onboard network, and a HV battery, which comprises a first sub-branch and a second sub-branch, which are switched in series. In the method, the at least one HV onboard network is connected to the poles of the HV battery and supplied with electric energy, and the at least one LV onboard network is connected to the output of a DC/DC converter, in which a first input module having a HV bridge is connected to the first sub-branch, and a second input module having a HV bridge is connected to the second sub-branch, while each of the two input modules is connected to a primary winding of a transformer having two primary windings and one common secondary winding, and supplied with electric energy.

In normal operation, each phase carries respectively half the power to the transformer. In event of a fault in a sub-branch (a battery bank), the full power can be put out across the remaining sub-branch to the low-voltage onboard network, i.e., upon fault in the first sub-branch the full power is put out across the second sub-branch to the low-voltage onboard network and upon fault in the second sub-branch the full power is put out across the first sub-branch to the low-voltage onboard network.

A symmetrical load regulating and battery workload can be realized. For nonsymmetrical battery charging, a balancing function of the two sub-branches can be realized, which compensates for the asymmetry.

In one embodiment, the output voltage of the HV battery has a value in the range of 200 to 1200 V, such as in the range of 400 V to 800 V.

If a bank charging of the HV battery is done, during which the two branches of the HV battery are switched in parallel in order to make possible a charging with half the rated voltage (such as 400 V), double the power can be put out to the onboard network, in order to operate comfort features such as air conditioning, if necessary.

In one embodiment, the output voltage of the DC/DC converter has a value in the range of 10 to 60 V, such as in the range of 12 V to 48 V.

In the method, one HV battery and one DC/DC or direct current/direct current converter having two independent inputs are used, the HV battery comprising two branches each having at least one energy accumulator cell and each branch of the energy accumulator and each input of the DC/DC converter being connected to each other at both sides via conductors, and the poles of the HV energy accumulator provide a HV voltage for the at least one HV circuit and the output of the DC/DC converter provides a LV voltage for the at least one LV circuit of the vehicle.

It is possible to implement one embodiment of this method with one embodiment of the proposed system.

In this case, a higher availability is provided for the at least one LV circuit than for the at least one HV circuit.

In the method, electric energy can be exchanged unidirectionally or bidirectionally between the branches or their energy accumulator cells of the HV battery and the participants of the at least one HV onboard network. It is possible for at least one participant to be supplied with electric energy from the HV battery, i.e., from at least one branch of the HV battery. Accordingly, it is possible to charge at least one branch of the HV battery with electric energy from at least one participant or to charge the participant and store electric energy in it. A participant is configured for example as an electric machine for propelling the vehicle, which in one operating mode as an electric motor transforms electric energy from the HV battery into mechanical energy and moves the vehicle. In one operating mode as an electric generator, the electric machine transforms mechanical energy due to motion into electric energy, for example during a recuperation, which is stored in the HV battery. It is possible for a participant to be configured for example as a fuel cell and thus as an energy source, the electric energy of which can likewise be stored in the HV battery. At least one further participant can be designed as an actuator, sensor and/or device, for example, at least one controller of the vehicle.

Thanks to the above described layout of the DC/DC converter and its connection to the branches of the HV battery, a highly available electricity supply of the LV onboard network of the vehicle is provided in a realization of the method and the system. In this case, the LV onboard network is supplied with electric energy from two branches of the HV battery by the DC/DC converter. The branches of the HV battery, which can also be called sub-branches, form together with the inputs of the DC/DC converter parallel power supply pathways for the participants, such as consumers, of the LV onboard network. A fault in one branch will not result in a fault, especially a complete failure, of the electrical power supply of the LV onboard network, since its availability is enhanced thanks to the parallel arrangement of the branches relative to each other. The HV battery can be realized by a variable battery concept, it being conceivable for the branches to have many different energy cells and/or different designs of energy cells, such as battery cells and/or capacitors. Thanks to the parallel power supply through the DC/DC converter, a fault in one input module does not result in a fault of the electrical power supply of the LV onboard network.

Of course, the above mentioned features and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments of the invention are represented schematically in the drawing and shall be described schematically and at length with reference to the drawing.

FIG. 1 shows in schematic representation a cutout view of one embodiment of a system to carry out one embodiment of a method.

DETAILED DESCRIPTION

FIG. 1 shows schematically a cutout view of one embodiment of an energy system 100. Not shown are the connection of the HV battery 10 to the HV onboard network, the HV onboard network, or the LV onboard network of the vehicle.

The HV battery 10 comprises a first sub-branch 11 and a second sub-branch 12. To the first sub-branch 11 is connected a first input module 21 of a DC/DC converter 20, and to the second sub-branch 12 is connected a second input module 22 of the DC/DC converter 20. In this way, a center tap of the HV battery 10 is realized. In the embodiment shown, the input modules 21 and 22 comprise full bridges as DC/AC converter. The two input modules 21 and 22 are connected to the primary side of a common transformer 23, having two primary windings and one common secondary winding. In the embodiment shown, the secondary winding of the transformer 23 comprises a center tap. The center tap is utilized on the secondary side of the transformer 23

(center tap technology). The output of the DC/DC converter 20 is connected to the LV onboard network of the vehicle.

German patent application no. 10 2021 128141.5, filed Oct. 28, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for an electrical power supply of an electric vehicle, the electric vehicle having at least one high voltage (HV) onboard network and at least one low voltage (LV) onboard network, the system comprising:
   a high voltage (HV) battery, which is connected across circuit breaker elements to the at least one HV onboard network, and which comprises a first sub-branch and a second sub-branch, which are switched in series;
   a transformer having two primary windings and one common secondary winding; and
   a DC/DC converter having a first input module and a second input module,
   wherein the first input module of the DC/DC converter, which comprises a high voltage (HV) bridge and is connected to a first one of the primary windings of the transformer, is connected to the first sub-branch of the HV battery, and
   wherein the second input module of the DC/DC converter, which comprises a high voltage (HV) bridge and is connected to a second one of the primary windings of the transformer, is connected to the second sub-branch of the HV battery, and
   wherein an output of the DC/DC converter is connected to the at least one LV onboard network.

2. The system according to claim 1, in which the HV bridges of the first and second input modules of the DC/DC converter are designed as full bridges.

3. The system according to claim 1, in which the HV bridges of the first and second input modules of the DC/DC converter are designed as half bridges.

4. The system according to claim 1, in which the HV bridges of the first and second input modules of the DC/DC converter are designed as a resonance converter.

5. The system according to claim 1, in which the DC/DC converter comprises an active or passive rectifier on a secondary side of the transformer.

6. The system according to claim 1, in which the DC/DC converter comprises an active full bridge on a secondary side of the transformer.

7. The system according to claim 1, in which the DC/DC converter comprises a current doubler on a secondary side of the transformer.

8. The system according to claim 1, in which the secondary winding of the transformer comprises a center tap, which is utilized by the DC/DC converter on a secondary side of the transformer.

9. A method for an electrical power supply of an electric vehicle, the electric vehicle having at least one high voltage (HV) onboard network and at least one low voltage (LV) onboard network, and a high voltage (HV) battery, which HV battery comprises a first sub-branch and a second sub-branch, which are switched in series, the method comprising:
   supplying electric energy to the at least one HV onboard network, which is connected to the HV battery; and
   supplying electric energy to the at least one LV onboard network, which is connected to an output of a DC/DC converter, in which a first input module having a high voltage (HV) bridge is connected to the first sub-branch of the HV battery, and a second input module having a high voltage (HV) bridge is connected to the second sub-branch of the HV battery, while each of the first and second input modules is connected to a respective primary winding of a transformer having two primary windings and one common secondary winding.

10. The method according to claim 9, in which upon a fault in the first sub-branch full power is put out across the second sub-branch to the at least one LV onboard network and upon a fault in the second sub-branch full power is put out across the first sub-branch to the at least one LV onboard network.

\* \* \* \* \*